US006855652B2

(12) United States Patent
Hable et al.

(10) Patent No.: US 6,855,652 B2
(45) Date of Patent: Feb. 15, 2005

(54) STRUCTURALLY REINFORCED PANELS

(75) Inventors: Christopher Hable, Romeo, MI (US); Michael J. Czaplicki, Rochester, MI (US)

(73) Assignee: L&L Products, Inc., Romeo, MI (US)

( * ) Notice: Subject to any disclaimer, the term of this patent is extended or adjusted under 35 U.S.C. 154(b) by 191 days.

(21) Appl. No.: 09/939,152

(22) Filed: Aug. 24, 2001

(65) Prior Publication Data

US 2003/0039792 A1 Feb. 27, 2003

(51) Int. Cl.[7] ............................................. B32B 5/18
(52) U.S. Cl. .................... 442/226; 442/20; 442/43; 442/183; 442/186; 442/290; 420/71; 420/702; 420/219; 420/201; 420/340; 420/426; 428/458; 428/469; 52/783.1; 52/784.1
(58) Field of Search ................................ 428/219, 201, 428/116, 73, 71, 340, 426, 457, 458, 469, 688, 689, 702, 57, 59; 442/2, 20, 43, 185, 181, 182, 183, 186, 286, 290, 221, 226; 52/782.1, 783.1, 784.1

(56) References Cited

U.S. PATENT DOCUMENTS

| | | |
|---|---|---|
| 3,868,796 A | 3/1975 | Bush |
| 4,378,395 A | 3/1983 | Asoshina et al. |
| 4,444,818 A | 4/1984 | Tominaga et al. |
| 4,451,518 A | 5/1984 | Miura et al. |
| 4,463,870 A | 8/1984 | Coburn, Jr. et al. |
| 4,476,183 A | 10/1984 | Holtrop et al. |
| 4,610,836 A | 9/1986 | Wycech |
| 4,687,697 A * | 8/1987 | Cambo et al. |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,813,690 A | 3/1989 | Coburn, Jr. |
| 4,822,011 A | 4/1989 | Goldbach et al. |
| 4,836,516 A | 6/1989 | Wycech |
| 4,853,270 A | 8/1989 | Wycech |
| 4,861,097 A | 8/1989 | Wycech |
| 4,901,500 A | 2/1990 | Wycech |
| 4,908,930 A | 3/1990 | Wycech |

(List continued on next page.)

FOREIGN PATENT DOCUMENTS

| | | |
|---|---|---|
| AT | 0 236 291 | 9/1987 |
| DE | 42 26 988 A1 | 2/1994 |

(List continued on next page.)

OTHER PUBLICATIONS

Copending U.S. Appl. No. 09/584,211 filed May 31, 2000.
Copending U.S. Appl. No. 09/665,965 filed Sep. 6, 2000.
Copending U.S. Appl. No. 09/858,939 filed May 16, 2001.
Copending U.S. Appl. No. 09/859,126 filed May 16, 2001.
Copending U.S. Appl. No. 09/906,289 filed Jul. 16, 2001.
Copending U.S. Appl. No. 09/923,138 filed Aug. 6, 2001.
Copending U.S. Appl. No. 09/974,017 filed Oct. 10, 2001.
Copending U.S. Appl. No. 09/939,245 filed Aug. 24, 2001.
Copending U.S. Appl. No. 09/982,681 filed Oct. 18, 2001.
Copending U.S. Appl. No. 60/296,312 filed Jun. 6, 2001.
Copending U.S. Appl. No. 60/676,725 filed Sep. 29, 2000.
Copending U.S. Appl. No. 60/317,009 filed Sep. 4, 2001.
Copending U.S. Appl. No. 09/428,243 filed Oct. 27, 1999.
Copending U.S. Appl. No. 09/459,756 filed Dec. 10, 1999.
Copending U.S. Appl. No. 09/502,686 filed Feb. 11, 2000.
Copending U.S. Appl. No. 09/524,298 filed Mar. 14, 2000.
Copending U.S. Appl. No. 09/524,961 filed Mar. 14, 2000.
Copending U.S. Appl. No. 09/631,211 filed Aug. 3, 2000.
Copending U.S. Appl. No. 09/676,335 filed Sep. 29, 2000.
Copending U.S. Appl. No. 09/676,443 filed Sep. 29, 2000.

*Primary Examiner*—Deborah Jones
*Assistant Examiner*—Wendy Boss
(74) *Attorney, Agent, or Firm*—Dobrusin & Thennisch PC

(57) ABSTRACT

A structurally reinforced panel and a method of forming the panel are disclosed. The reinforcement includes a fibrous woven material in a bondable plastic matrix.

24 Claims, 2 Drawing Sheets

U.S. PATENT DOCUMENTS

| | | | |
|---|---|---|---|
| 4,910,067 A | 3/1990 | O'Neill | |
| 4,922,596 A | 5/1990 | Wycech | |
| 4,923,902 A | 5/1990 | Wycech | |
| 4,978,562 A | 12/1990 | Wycech | |
| 4,995,545 A | 2/1991 | Wycech | |
| 5,124,186 A | 6/1992 | Wycech | |
| 5,266,133 A | 11/1993 | Hanley et al. | |
| 5,290,079 A | 3/1994 | Syamal | |
| 5,358,397 A | 10/1994 | Ligon et al. | |
| 5,373,027 A | 12/1994 | Hanley et al. | |
| 5,506,025 A | 4/1996 | Otto et al. | |
| 5,575,526 A | 11/1996 | Wycech | |
| 5,577,784 A | 11/1996 | Nelson | |
| 5,755,486 A | 5/1998 | Wycech | |
| 5,766,719 A | 6/1998 | Rimkus | |
| 5,806,919 A | 9/1998 | Davies | |
| 5,851,626 A | 12/1998 | McCorry et al. | |
| 5,884,960 A | 3/1999 | Wycech | |
| 5,888,600 A | 3/1999 | Wycech | |
| 5,894,071 A | 4/1999 | Merz et al. | |
| 5,932,680 A | 8/1999 | Heider | |
| 5,985,435 A | 11/1999 | Czaplicki et al. | |
| 5,992,923 A | 11/1999 | Wycech | |
| 6,003,274 A | 12/1999 | Wycech | |
| 6,006,484 A | 12/1999 | Geissbuhler | |
| 6,033,300 A | 3/2000 | Schneider | |
| 6,058,673 A | 5/2000 | Wycech | |
| 6,068,424 A | 5/2000 | Wycech | |
| 6,079,180 A | 6/2000 | Wycech | |
| 6,092,864 A | 7/2000 | Wycech et al. | |
| 6,096,403 A | 8/2000 | Wycech | |
| 6,099,948 A | 8/2000 | Paver, Jr. | |
| 6,103,341 A | 8/2000 | Barz et al. | |
| 6,103,784 A | 8/2000 | Hilborn et al. | |
| 6,131,897 A | 10/2000 | Barz et al. | |
| 6,149,227 A | 11/2000 | Wycech | |
| 6,150,428 A | 11/2000 | Hanley, IV et al. | |
| 6,165,588 A | 12/2000 | Wycech | |
| 6,168,226 B1 | 1/2001 | Wycech | |
| 6,189,953 B1 | 2/2001 | Wycech | |
| 6,196,621 B1 | 3/2001 | VanAssche et al. | |
| 6,197,403 B1 | 3/2001 | Brown et al. | |
| 6,199,940 B1 | 3/2001 | Hopton et al. | |
| 6,232,433 B1 | 5/2001 | Narayan | |
| 6,233,826 B1 | 5/2001 | Wycech | |
| 6,237,304 B1 | 5/2001 | Wycech | |
| 6,253,524 B1 | 7/2001 | Hopton et al. | |
| 6,263,635 B1 | 7/2001 | Czaplicki | |
| 6,270,600 B1 | 8/2001 | Wycech | |
| 6,272,809 B1 | 8/2001 | Wycech | |
| 6,276,105 B1 | 8/2001 | Wycech | |
| 6,281,260 B1 | 8/2001 | Hanley, IV et al. | |
| 6,287,666 B1 | 9/2001 | Wycech | |
| 6,296,298 B1 | 10/2001 | Barz | |
| 6,303,672 B1 | 10/2001 | Papalos et al. | |
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,332,731 B1 | 12/2001 | Wycech | |
| 6,341,467 B1 | 1/2002 | Wycech | |
| 6,348,513 B1 | 2/2002 | Hilborn et al. | |
| 6,358,584 B1 | 3/2002 | Czaplicki | |
| 6,368,438 B1 | 4/2002 | Chang et al. | |
| 6,372,334 B1 | 4/2002 | Wycech | |
| D457,120 S | 5/2002 | Broccardo et al. | |
| 6,382,635 B1 | 5/2002 | Fitzgerald | |
| 6,383,610 B1 | 5/2002 | Barz et al. | |
| 6,389,775 B1 | 5/2002 | Steiner et al. | |
| 6,406,078 B1 | 6/2002 | Wycech | |
| 6,413,611 B1 | 7/2002 | Roberts et al. | |
| 6,419,305 B1 | 7/2002 | Larsen | |
| 6,422,575 B1 | 7/2002 | Czaplicki et al. | |
| H2047 H | 9/2002 | Harrison et al. | |
| 6,451,231 B1 | 9/2002 | Harrison et al. | |
| 6,455,146 B1 | 9/2002 | Fitzgerald | |
| 6,467,834 B1 | 10/2002 | Barz et al. | |
| 6,471,285 B1 | 10/2002 | Czaplicki et al. | |
| 6,474,722 B2 | 11/2002 | Barz | |
| 6,474,723 B2 | 11/2002 | Czaplicki et al. | |
| 6,475,577 B1 | 11/2002 | Hopton et al. | |
| 6,482,486 B1 | 11/2002 | Czaplicki et al. | |
| 6,482,496 B1 | 11/2002 | Wycech | |
| 6,502,821 B2 | 1/2003 | Schneider | |
| 6,519,854 B2 | 2/2003 | Blank | |
| 6,523,857 B1 | 2/2003 | Hopton et al. | |
| 6,523,884 B2 | 2/2003 | Czaplicki et al. | |
| 6,546,693 B2 | 4/2003 | Wycech | |
| 6,561,571 B1 | 5/2003 | Brennecke | |
| 6,575,526 B2 | 6/2003 | Czaplicki et al. | |
| 2002/0074827 A1 | 6/2002 | Fitzgerald et al. | |

FOREIGN PATENT DOCUMENTS

| | | |
|---|---|---|
| DE | 198 12 288 C1 | 5/1999 |
| DE | 198 56 255 C1 | 1/2000 |
| DE | 198 58 903 A1 | 6/2000 |
| EP | 0 061 131 | 9/1982 |
| EP | 0 611 778 | 8/1994 |
| EP | 0 775 721 | 5/1997 |
| EP | 0 891 918 A1 | 1/1999 |
| EP | 0 893 331 A1 | 1/1999 |
| EP | 0 893 332 A1 | 1/1999 |
| EP | 1 072 647 A2 | 1/2001 |
| EP | 1 122 156 A2 | 8/2001 |
| EP | 0 893 332 B1 | 3/2002 |
| FR | 2 749 263 | 12/1997 |
| GB | 2 061 196 | 5/1981 |
| GB | 2 375 328 A | 11/2002 |
| WO | WO 95/32110 | 11/1995 |
| WO | WO 97/02967 | 1/1997 |
| WO | WO 97/43501 | 11/1997 |
| WO | WO 98/50221 | 11/1998 |
| WO | WO 99/08854 | 2/1999 |
| WO | WO 99/28575 | 6/1999 |
| WO | WO 99/36243 | 7/1999 |
| WO | WO 99/48746 | 9/1999 |
| WO | WO 99/50057 | 10/1999 |
| WO | WO 99/61216 | 12/1999 |
| WO | WO 99/61281 | 12/1999 |
| WO | WO 00/12571 | 3/2000 |
| WO | WO 00/12595 | 3/2000 |
| WO | WO 00/13876 | 3/2000 |
| WO | WO 00/13958 | 3/2000 |
| WO | WO 00/20483 | 4/2000 |
| WO | WO 00/27920 | 5/2000 |
| WO | WO 00/37243 | 6/2000 |
| WO | WO 00/37302 | 6/2000 |
| WO | WO 00/37554 | 6/2000 |
| WO | WO 00/39232 | 7/2000 |
| WO | WO 00/40629 | 7/2000 |
| WO | WO 00/40815 | 7/2000 |
| WO | WO 00/43254 | 7/2000 |
| WO | WO 00/46461 | 8/2000 |
| WO | WO 00/52086 | 9/2000 |
| WO | WO 00/55444 | 9/2000 |
| WO | WO 00/68041 | 11/2000 |
| WO | WO 01/54936 | 8/2001 |
| WO | WO 01/56845 | 8/2001 |
| WO | WO 01/57130 | 8/2001 |
| WO | WO 01/71225 | 9/2001 |
| WO | WO 01/83206 | 11/2001 |
| WO | WO 01/88033 A1 | 11/2001 |

\* cited by examiner

STRUCTURALLY REINFORCED PANELS

FIELD OF THE INVENTION

The present invention relates generally to a structurally reinforced panel of an automotive vehicle or other article of manufacture, and more particularly to a panel structurally reinforced with a structural matrix material and a woven fibrous material.

BACKGROUND OF THE INVENTION

For many years the transportation industry has been concerned with designing structural members that do not add significantly to the weight of a vehicle. At the same time, automotive applications require structural members capable of providing reinforcement to targeted portions of the vehicle such as vehicle panels. It is known to apply a layer of heat activated matrix material along with a fibrous reinforcement material to panels of automotive vehicles for structurally reinforcing the panels. However, the fibrous material that is presently used to achieve desired levels of reinforcement of the panels can be expensive. Additionally, desired levels of reinforcement may not be achieved with the presently used fibrous material unless the fabric has a sufficiently high weight. Thus, there is a need to replace the presently used fibrous material with a lower cost material that can be applied to vehicle panels along with the matrix material wherein the replacement material provides sufficient reinforcement to the panels, the matrix material or both. There is also a need to provide a fibrous material that can be applied to vehicle panels along with the matrix material wherein the fibrous material is lightweight, but continues to provide sufficient reinforcement to the panels.

SUMMARY OF THE INVENTION

The present invention satisfies one or more of these needs by providing a structurally reinforced panel. A fiberglass woven roving is bonded to at least part of the matrix material.

According to another embodiment, the present invention provides a composite material for reinforcing a panel portion of an automotive vehicle. The composite material includes a layer of matrix material and a fibrous material laminated to the matrix material. Preferably, the fibrous material is woven one or less times prior to lamination of the material upon the matrix material.

The present invention also provides a method of forming a structurally reinforced panel. The method includes a first step of providing a panel portion of the automotive vehicle. In another step, a layer matrix material is applied over at least part of a surface of the panel portion. In yet another step a fiberglass woven roving is laminated to at least part of the matrix material either before or after the matrix material is applied to the surface of the panel portion.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The invention relates to a structurally reinforced panel of an article, such as an automotive vehicle, a household or industrial appliance, furniture, storage containers or the like, and to a method of forming the panel. More particularly, the present invention relates to a reinforced panel of an automotive vehicle that includes a panel portion, a layer of matrix material applied (e.g., adhered or otherwise bonded) to at least part of a surface of the panel portion and a fibrous material (e.g., a woven roving) applied (e.g., laminated) to the matrix material. Preferably, the fibrous material of the panel portion provides a high strength to weight reinforcement material.

Figure 1:
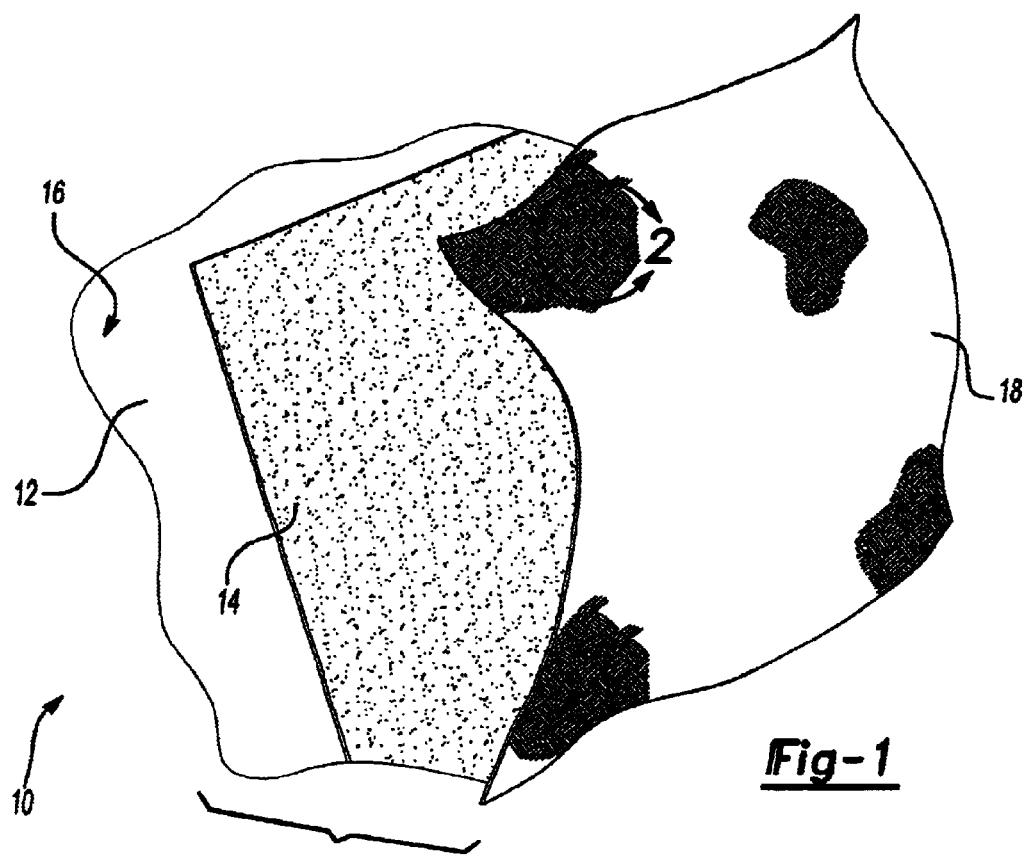
FIG. 1 is an exploded perspective view of a layer of matrix material and a woven roving being applied to a metal panel of an automotive vehicle according to an aspect of the present invention.
Figure 2:
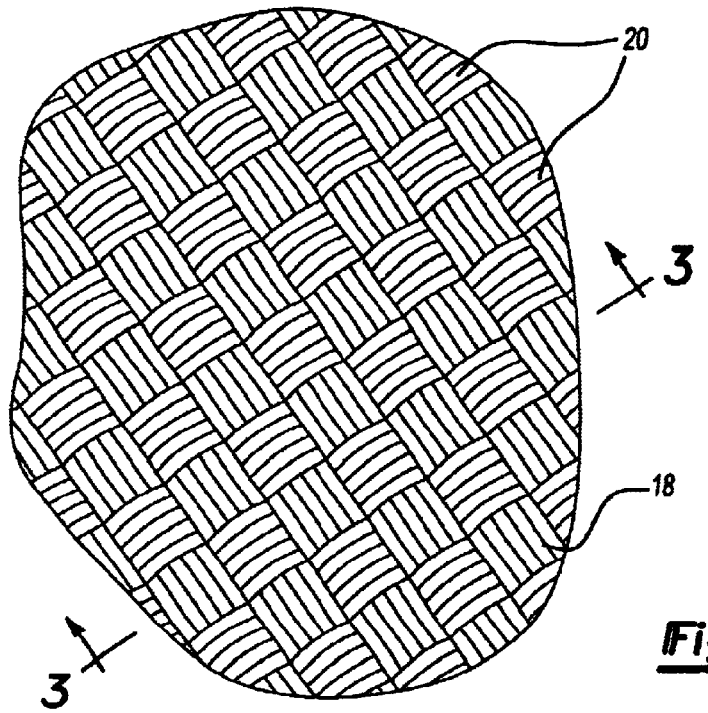
FIG. 2 is a magnified view of a portion of the woven roving of FIG. 1 taken in the circle 2 of FIG. 1.
Figure 3:
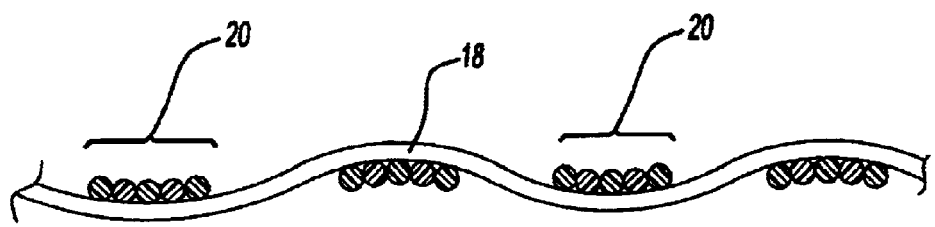
FIG. 3 is a sectional view of the portion of the woven roving of FIG. 2 taken along line 3—3.
Figure 4:
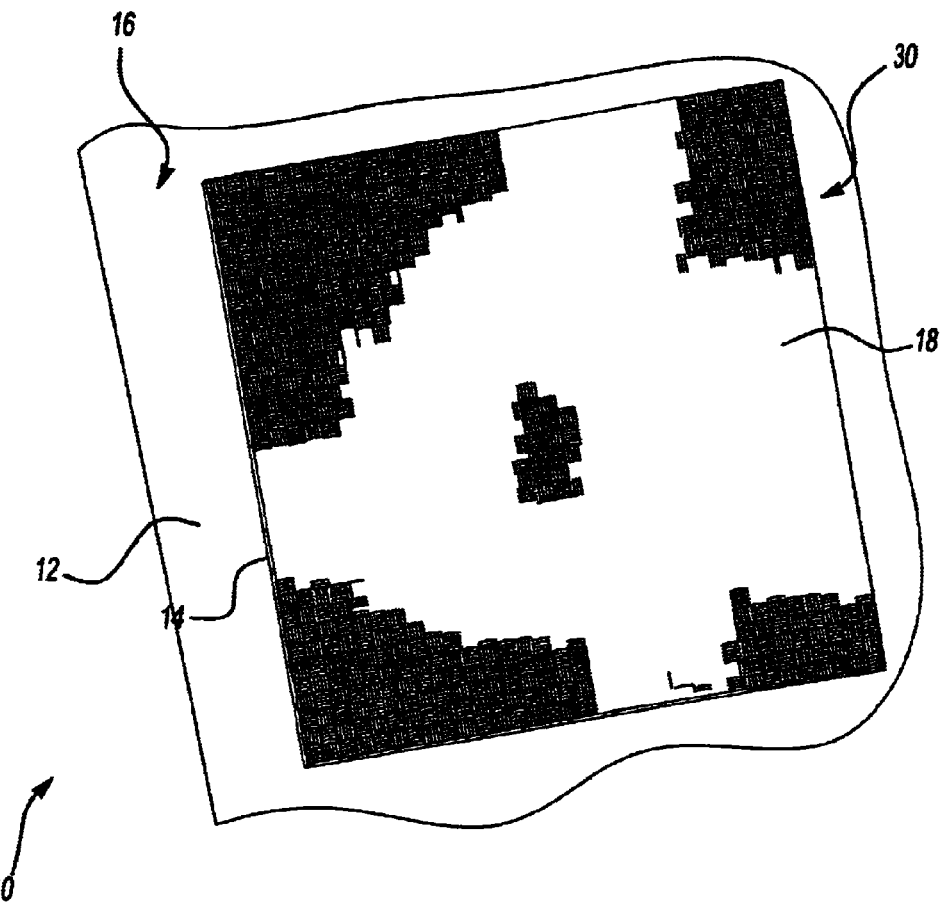
FIG. 4 is a perspective view of the layer of matrix material and the woven roving of FIG. 1 as applied to the metal panel of FIG. 1.

Referring to FIGS. 1–4, there is illustrated an exemplary embodiment of a structurally reinforced panel 10. The panel 10 includes a panel portion 12, a layer 14 of matrix material applied to at least part of a surface 16 of the panel portion 12 and fibrous material reinforcement 18 (e.g., fiberglass roving) applied to the layer 14 of matrix material.

The layer 14 of matrix material may be configured in any shape, design, or thickness corresponding to the dimensions of the selected panel portion 12 of the vehicle or as otherwise desired. Typically, the matrix material is selected so as to be activable under a desired condition to soften (e.g, melt), expand, foam or otherwise change states such that the matrix material can wet, and preferably bond to adjacent surfaces (e.g., the surfaces provided by the roving 18 and the panel portion 12). In one embodiment, the matrix material is also selected to cure during or after activation and, upon or after cure, form a relatively low density, low weight material with high strength characteristics such as high stiffness for imparting structural rigidity to reinforced region of the panel portion 12. Other desired characteristics of the matrix material might include high glass transition temperature (typically greater than 70 degrees Celsius), and good adhesion retention, particularly in the presence of corrosive or high humidity environments.

A number of structurally reinforcing matrix materials may be used to form the layer 14. The matrix material may be a thermoplastic, a thermoset or a blend thereof. According to one embodiment, the matrix material is as an epoxy-based material, an ethylene-based polymer, or a mixture thereof, which when compounded with appropriate ingredients (typically a blowing agent, a curing agent, and perhaps a filler), typically expands and cures in a reliable and predictable manner upon the application of heat or another activation stimulus.

Thus, according to one embodiment, the matrix material is a heat-activated, epoxy-based resin having foamable characteristics upon activation through the use of heat typically encountered in an e-coat or other paint oven operation. Preferably, the epoxy matrix material is such that upon being heated, it structurally bonds to adjacent surfaces. From a chemical standpoint for a thermally-activated material, such matrix material is usually initially processed as a thermoplastic material before curing. After curing, the matrix material typically becomes a thermoset material that is fixed and incapable of any substantial flowing. Examples of preferred formulations that are commercially available include those available from L&L Products, Inc. of Romeo, Mich., under the designations L-5204, L-5206, L-5207, L-5208, L-5209, L-5214, L-5222 and L-8000.

The layer 14 of matrix material may be formed using a variety of processing techniques, machines and the like. Possible processing techniques for the preferred materials include injection molding, blow molding, thermoforming, extrusion with a single or twin screw extruder or extrusion with a mini-applicator extruder. In a preferred embodiment, the layer 10 of matrix material is extruded using a twin-screw extruder and with the resulting layer 14 having a substantially continuous thickness or a variable thickness.

Though preferred matrix materials are disclosed other suitable art disclosed matrix material may be used in conjunction with the present invention. The choice of the matrix material used will be dictated by performance requirements and economics of the specific application and requirements. Examples of other possible matrix materials include, but are not limited to, polyolefin materials, copolymers and terpolymers with at one monomer type an alpha-olefin, phenol/formaldehyde materials, phenoxy material, polyurethane materials with high glass transition temperatures (including polyureas), and mixtures or composites (optionally including solid or porous metals). See also, U.S. Pat. Nos. 5,766,719; 5,755,486; 5,575,526; 5,932,680 (incorporated herein by reference).

Generally speaking, exemplary automotive vehicle applications may utilize technology and processes such as those disclosed in U.S. Pat. Nos. 4,922,596, 4,978,562, 5,124,186 and 5,884,960 and commonly owned, co pending U.S. application Ser. No. 09/502,686 filed Feb. 11, 2000, Ser. No. 09/524,961 filed Mar. 14, 2000, No. 60/223,667 filed Aug. 7, 2000, No. 60/225,126 filed Aug. 14, 2000, Ser. No. 09/676,443 filed Sep. 29, 2000, Ser. No. 09/676,335 filed Sep. 29, 2000, Ser. No. 09/676,725 filed Sep. 29, 2000, and particularly, Ser. No. 09/459,756 filed Dec. 10, 1999, all of which are expressly incorporated by reference.

In applications where the matrix material is a heat activated material, such as when a thermally melting, expanding, or foaming material is employed, an important consideration involved with the selection and formulation of the material can be the temperature at which the material activates, cures or both. In most applications, it is undesirable for the material to activate at room temperature or the ambient temperature in a production or assembly environment. For automotive applications, it may be desirable for the matrix material to activate at higher processing temperatures, such as those encountered in an automobile assembly plant, when the matrix material is processed along with the automobile components at elevated temperatures. Exemplary temperatures encountered in an automobile assembly body shop oven may be in the range of 148.89° C. to 204.44° C. (300° F. to 400° F.), and paint shop oven temps are commonly about 93.33° C. (215° F.) or higher. If needed, for foaming or expanding type matrix materials, various blowing agent activators can be incorporated into the composition to cause expansion at different temperatures outside the above ranges.

Although many matrix materials may be heat activated, other matrix materials that are activated by another stimuli and are capable of bonding also can be used. Without limitation, such matrix material may be activated by temperature stimuli such as, pressure, chemically, or by other ambient conditions.

The woven roving 16 of the reinforced panel 10 is comprised of several strips 20 woven together as a sheet. Each strip 20 is formed of several fiberglass fibers that are grouped together to form the strip 20. The fibers of each strip 20 are generally untwisted, unwoven or generally extend parallel to one another. The lengths of the strips 20 are generally chosen based upon the application of the roving 18. Preferably, each strip 20 has a width that is between about 0.15 centimeters and about 8 centimeters. Even more preferable, each strip 20 has a width of between about 2 centimeters and 5 centimeters. Most preferably, each strip 20 has a width of about 3 to 4 centimeters. The roving 18 may be treated with a coupling agent to assist in securing the roving 18 to the layer 14 of matrix material. Additionally, the roving 18 may include stitching or other fastening mechanism across the widths of one or more of the strips 20 of the roving 18 to enhance the integrity of the roving 18.

The weight of the roving 16 may be varied depending upon the corresponding layer 14, panel portion 12 or both that the roving is being used with. The weight of the roving may be about 5 to about 15 ounces per square yard. In one embodiment, the weight of the roving is about less than about 20 ounces per square yard, and more preferably less than about 10 ounces per square yard. In a highly preferred embodiment, the weight of the roving is about less than 8 ounces per square yard. The roving may exhibit a relatively fine weave, although a more coarse weave is also useful. The particular weave may also be selected to suit a particular application, and preferably to avoid unnecessary handling of the fibres that potentially might affect their individual integrity. The roving 18, for instance, typically includes several fiberglass strands that are grouped together, but are not woven together. Thereafter, the roving 18 is formed by weaving the groups of unwoven strands together into a fabric. Such reduced handling of the strands tends to minimize structural defects in the strands, which, in turn, can strengthen the overall roving. In another embodiment, a twill might be selected wherein the fibers float over two intersections and under two intersections.

The thickness of the roving may range from about 1 mil or higher, and more preferably about 5 mils or higher, and still more preferably about 10 mils or higher. The woven roving 18 is applied or laminated to at least one side of the layer 14. Generally, the roving 18 may be positioned as desired upon the side of the layer 14. Preferably, the layer 14 is at least slightly tacky prior to its activation, cure or both such that the roving 18 can adhere to the layer 14 until the layer is activated. A pressure or force is typically applied to the roving 18, the layer 14 or both urging the roving 18 into intimate contact with layer 14.

In the preferred embodiment wherein the layer 14 is formed by extrusion, release paper may be applied to a side of layer 14 opposite the woven roving 18 while the layer 14 is still in its pre-activated tacky state. Thereafter, the roving 18, the release paper or both may be pressed into intimate contact with layer 14 using one or more rollers. Preferably, the side of the layer 14 covered by the release paper remains protected and at least partially tacky such that the release paper may be removed and the layer 14 may be applied to the panel portion 12.

The matrix material and the roving 18 may be applied generally as desired to the panel portion 12. Preferably, however, the matrix material and roving 18 are applied to panel portions to reduce deformation in selected areas. For targeting certain areas or for properly fitting the matrix material and roving upon a panel portion, preformed patterns may also be employed such as those made by molding, lay-up, or by extruding a sheet (having a flat or contoured surface) of matrix material, woven roving or both with or without release paper and then die cutting the sheet in accordance with a predetermined configuration.

Preferably, the layer 14 is applied to the panel portion 12 in a solid or semi-solid state. However, the layer 14 may be applied to the surface 16 of the panel portion 12 in a fluid state using commonly known manufacturing techniques. The material 14 may be heated to a temperature that permits the matrix material to flow slightly to aid in wetting the surface 16 of the panel portion 12. Upon curing the layer 14 preferably hardens and adheres to the surface 16 of the panel portion 12. Alternatively, the layer 14 may also be applied by heat bonding/thermoforming or by co-extrusion.

As the layer 14 of matrix material is activated by heat or other stimulus, the layer 14 preferably wets the roving to promote integration of the roving 18 with the layer 14 such that the strands of fiberglass of each of the strips 20 tend to bond to the layer 14 and each other. In one embodiment, the wetting of the roving 18 can be advantageously enhanced by foaming or bubbling of the matrix material, which can enhance the integration of the roving 18 into the matrix material. In this manner, the roving 18 and the layer 14 are formed into a composite material 30. Preferably, the strength of the composite material 30 is greater than the sum of the strength of the matrix material and the roving 18.

Advantageously, the roving 18 provides an inexpensive reinforcement for the panel portion 12 and for the layer 14 of matrix material. Also advantageous, the roving 18 has shown surprisingly good strength and reinforcing characteristics such that the roving 18 may utilize lighter weight material while maintaining acceptable levels of reinforcement. It is contemplated that the panel portion 12, the roving 18 and the matrix material 14, after expansion, create a composite reinforced panel 10 whereby the overall panel 10 strength and stiffness are greater than the sum of the individual components. Advantageously, the roving 18 has been shown to exhibit desirable strength characteristics particularly after the layer 14 has been activated and cured to integrate the roving 18 with the matrix material.

Although the present invention has been described with the fibrous material provided as a roving, it is contemplated that the fibrous material may be provided in a different format that also minimizes handling, processing or both of the material. For example, it is contemplated that fiberglass strands or other fibrous material may be applied to the layer 14 of matrix material without any weaving operation. Accordingly, a first set of generally parallel fiberglass strands may be applied to the matrix material extending in a first direction followed by application of a second set of fiberglass strands to the matrix material, wherein the second set of strands extend in a direction that is skew (e.g., perpendicular) to the direction of extension of the first set of strands. After application of each set of strands or after application of both sets of strands, rollers may be used to laminate the strands upon the matrix material. Thereafter, the fiberglass strands and matrix material may be processed as described above to form a composite material.

In the embodiment disclosed, the layer 14 of matrix material and the woven roving 18 (i.e., the composite material 30) may be utilized in conjunction with panel portions 12 of an automotive vehicle, which may be included in, without limitation, front and rear quarter panels, door panels, floor pans, floor panels, roof panels, hood panels, trunk panels and the like as well as other portions of an automotive vehicle which may be adjacent to the interior of exterior of the vehicle to form a reinforced panel 10.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A structurally reinforced panel for an article, comprising:
   (a) a panel;
   (b) a woven roving, having a weight of less than about 20 ounces per square yard, adjoining said panel; and
   (c) a matrix material for carrying said woven roving, said matrix material being bonded to said panel, over at least part of a surface of said panel.

2. A structurally reinforced panel as in claim 1, wherein said woven roving weighs less than 15 ounces per square yard.

3. A structurally reinforced panel as in claim 1, wherein said woven roving weighs less than 10 ounces per square yard.

4. A structurally reinforced panel as in claim 1, wherein said woven roving weight less than about 8 ounces per square yard.

5. A structurally reinforced panel as in claim 1, wherein said matrix material is epoxy-based.

6. A structurally reinforced panel as in claim 1, wherein said matrix material is expandable to assist in integrating said woven roving with said matrix material.

7. A composite material for reinforcing a panel of an automotive vehicle, comprising:
   a) a woven roving strip, having a weight of less than about 10 ounces per square yard, a width of between about 2 and about 5 cm and a thickness of greater than about 5 mils;
   b) an expandable epoxy-based matrix material, thermally activable in a temperature range of about 300° F. to 400° F. for carrying said woven roving, said matrix material being bondable to said panel over at least part of a surface of said panel; and
   c) a release layer laminated to a side of said matrix material for protecting said side of said matrix material prior to bonding said side of said matrix material to said panel.

8. A composite material as in claim 7, wherein said roving strip weighs less than 15 ounces per square yard.

9. A composite material as in claim 7, wherein said roving strip material weighs less than 10 ounces per square yard.

10. A composite material as in claim 7, wherein said roving strip weighs less than about 8 ounces per square yard.

11. A composite material as in claim 7, wherein said roving strip includes an e-glass.

12. A composite material as in claim 7, wherein said roving strip includes an S2-glass.

13. A structurally reinforced panel as in claim 1, wherein the woven roving is formed of fiberglass strands and the panel is formed of metal.

14. A structurally reinforced panel as in claim 1, wherein the matrix material is selected from an epoxy-based material, an ethylene-based polymer, or a mixture thereof.

15. A structurally reinforced panel as in claim 1, wherein the matrix material is an epoxy-based material.

16. A structurally reinforced panel for an automotive vehicle, comprising:
   (a) a metal panel, the metal panel being a part of the automotive vehicle;
   (b) a fibrous reinforcement material adjoining said panel, wherein:

i) the reinforcement material is comprised of a plurality of strips woven together as a sheet; and
ii) each of the plurality of strips is formed of several fibers which are grouped together, but which are generally unwoven relative to each other; and (c) a matrix material for carrying said fibrous reinforcement material, said matrix material being bonded to said panel, over at least part of a surface of said panel wherein;
i) the matrix material is a heat activated foamable material for assisting in integrating the fibrous reinforcement material with the matrix material.

17. A structurally reinforced panel as in claim 16, wherein the fibers for the fibrous reinforcement material are fiberglass.

18. A structurally reinforced panel as in claim 16, wherein each of the plurality of strips has a width between about 0.15 centimeters and about 8 centimeters.

19. A structurally reinforced panel as in claim 16, wherein the panel is a body panel and is selected from a quarter panel, a door panel, a roof panel, a hood panel or a trunk panel and wherein the matrix material activates at a temperature typically encountered in an e-coat or painting operation.

20. A structurally reinforced panel as in claim 16, wherein the matrix material is an epoxy-based material.

21. A structurally reinforced panel as in claim 16, wherein the matrix material is selected from an epoxy based material, an ethylene-based polymer or a mixture thereof.

22. A structurally reinforced panel for an automotive vehicle, comprising:

(a) a metal panel, the metal panel being a body panel of the automotive vehicle, the body panel being selected from a quarter panel, a door panel, a roof panel, a hood panel, a trunk panel or a floor panel;

(b) a fibrous reinforcement material having a weight of less than about 20 ounces per square yard, adjoining said panel, wherein:
i) the reinforcement material is comprised of a plurality of strips woven together as a sheet;
ii) each of the plurality of strips is formed of several fiberglass fibers which are grouped together, but which are generally unwoven relative to each other and which extend substantially parallel to each other; and
iii) each of the plurality of strips has a width between about 0.15 centimeters and about 8 centimeters; and (c) a matrix material selected from an epoxy based material, an ethylene-based polymer or a mixture thereof, for carrying said fibrous reinforcement material, said matrix material being bonded to said panel, over at least part of a surface of said panel wherein;
i) the matrix material is a heat activated foamable material for assisting in integrating the fibrous reinforcement material with the matrix material; and
ii) the matrix material activates at a temperature typically encountered in an e-coat or painting operation.

23. A structurally reinforced panel as in claim 22, wherein said woven roving weighs less than 15 ounces per square yard.

24. A structurally reinforced panel as in claim 22, wherein said woven roving thickness about 5 mils or higher.

* * * * *